Aug. 23, 1955  E. V. BERGSTROM  2,716,054
KILN INSULATING LINING
Filed Aug. 21, 1952  3 Sheets-Sheet 1
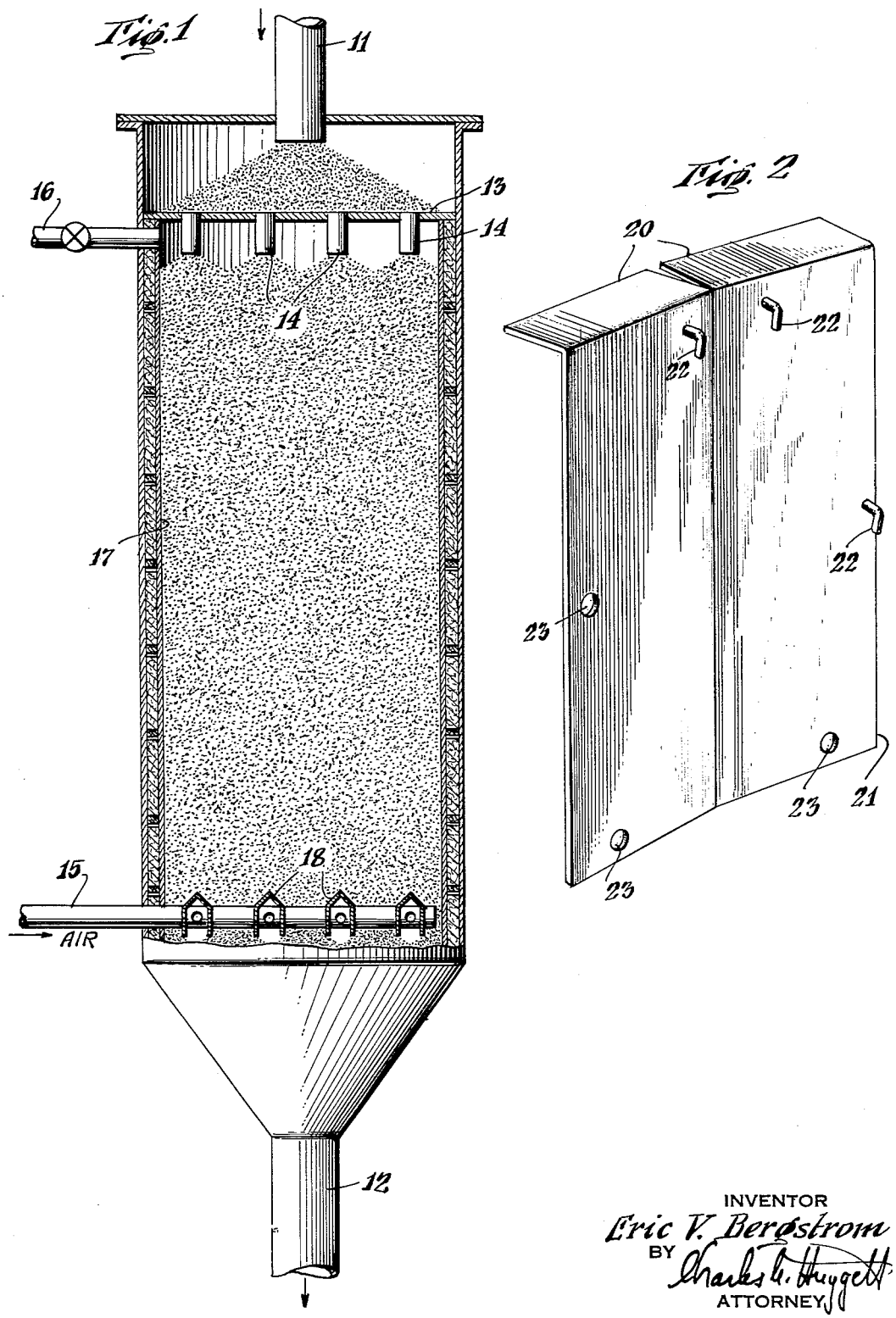
INVENTOR
Eric V. Bergstrom
BY
Charles G. Huggett
ATTORNEY Aug. 23, 1955  E. V. BERGSTROM  2,716,054
KILN INSULATING LINING
Filed Aug. 21, 1952  3 Sheets-Sheet 2
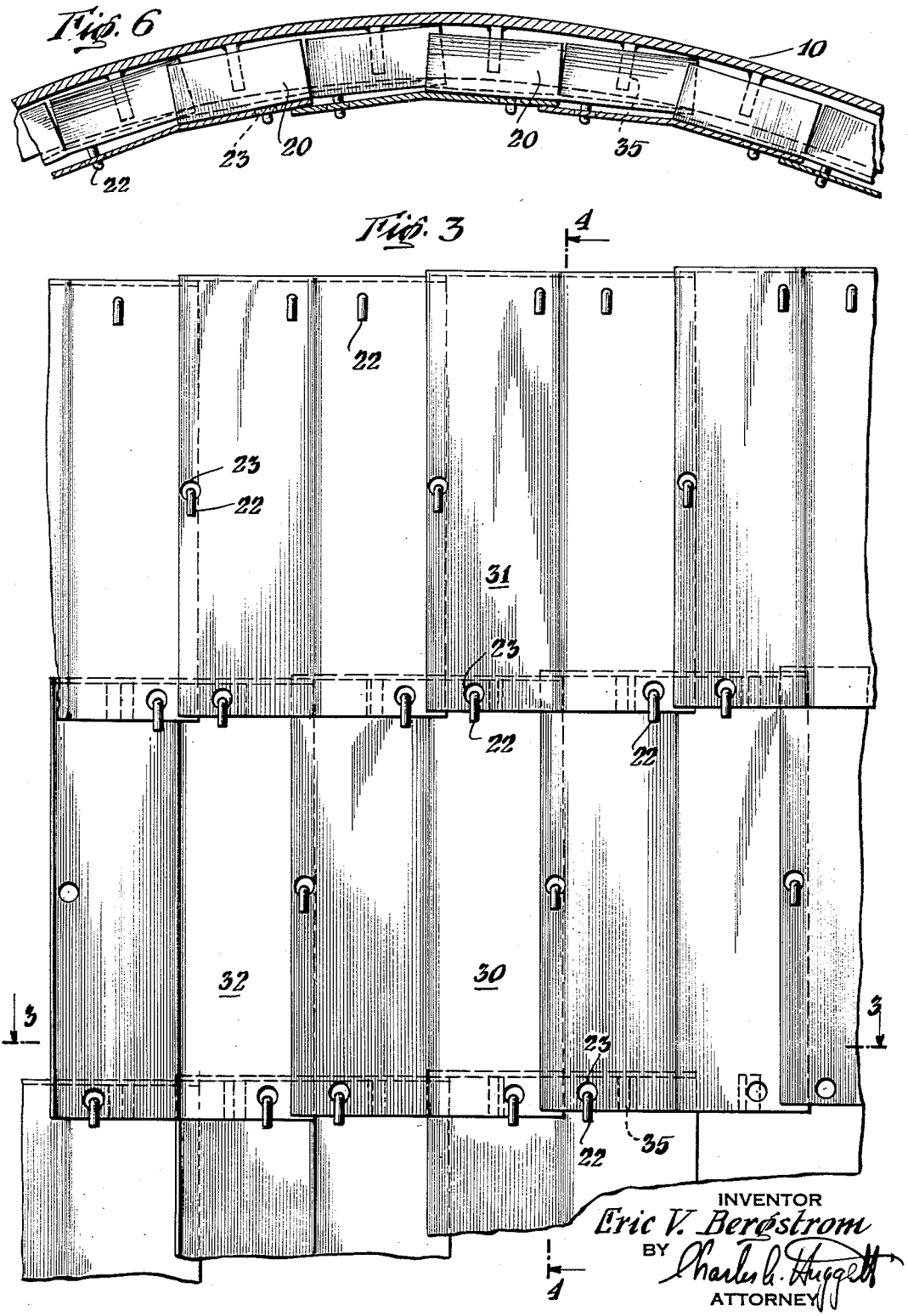
INVENTOR
Eric V. Bergstrom
BY
ATTORNEY Aug. 23, 1955   E. V. BERGSTROM   2,716,054
KILN INSULATING LINING
Filed Aug. 21, 1952   3 Sheets-Sheet 3
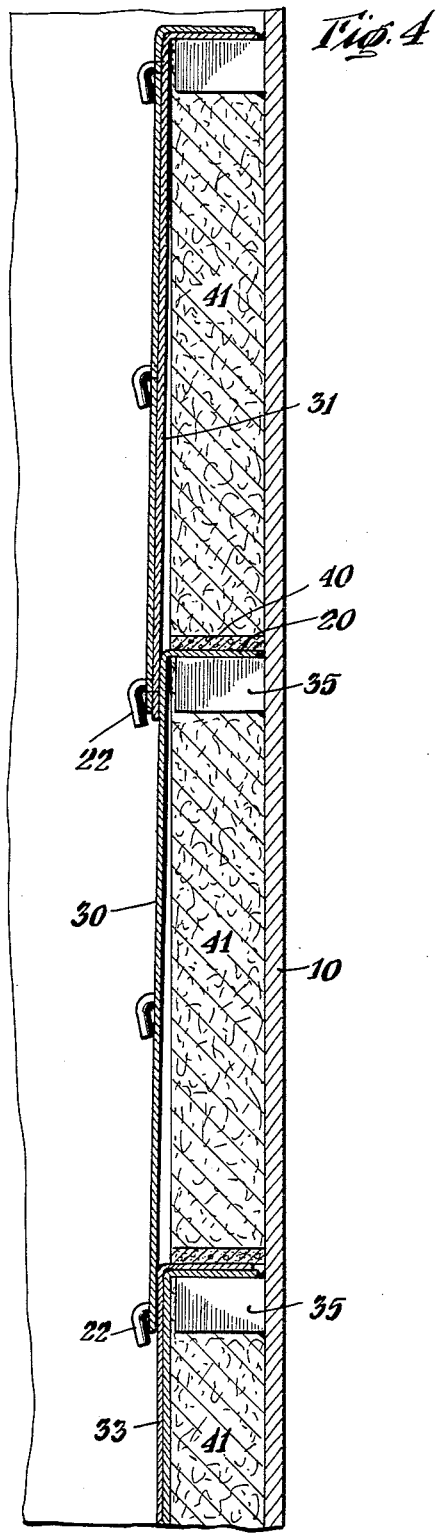
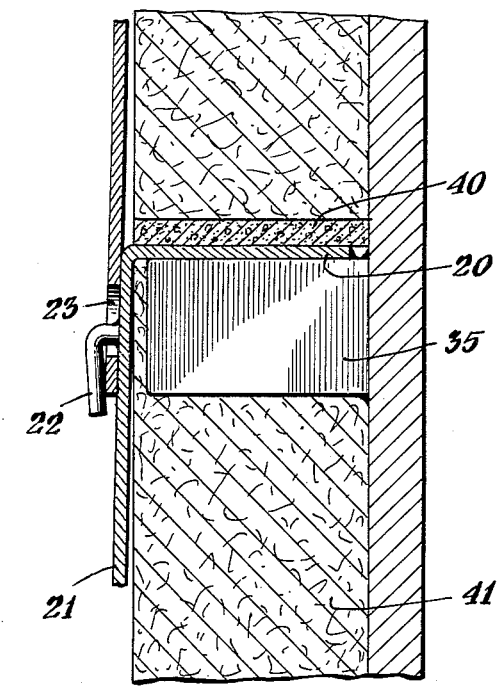
INVENTOR
Eric V. Bergstrom
BY Charles A. Huggett
ATTORNEY

United States Patent Office 2,716,054
Patented Aug. 23, 1955

2,716,054

KILN INSULATING LINING

Eric V. Bergstrom, Short Hills, N. J., assignor to Socony Mobil Oil Company, Inc., a corporation of New York Application August 21, 1952, Serial No. 305,671

3 Claims.  (Cl. 23—288)

This invention is directed to an improved lining for a contacting vessel in which a fluid is contacted with a granular solid contact material at elevated temperature. It is particularly directed to the provision of an improved lining in the kiln of a moving bed hydrocarbon conversion system through which a granular contact material is gravitated as a substantially compact mass and contacted with air at combustion conditions to burn carbonaceous material from the surface thereof.

In the hydrocarbon conversion art, it has become common practice to circulate granular contact material through an enclosed cyclic system which includes a reaction vessel and a reconditioning vessel. The particles are gravitated in substantially compact columnar form downwardly through the reaction vessel and are contacted with hydrocarbons under suitable reaction conditions. For example, for catalytic cracking of the hydrocarbons, the temperature in the reactor may be about 800–1000° F. and the pressure may be about 5–30 per square inch (gauge). During the cracking conversion, a carbonaceous deposit forms on the surface of the catalyst causing the catalyst activity to fall. The particles are, therefore, withdrawn continuously from the bottom of the reactor and transferred to the top of a regenerator or kiln. The solids are gravitated in substantially compact condition downwardly through the kiln and contacted with air at combustion conditions. The temperature may be about 1000–1300° F. and the pressure generally about atmospheric. The regenerated solids are withdrawn from the bottom of the kiln and transferred to the top of the reactor for reuse.

Most early kilns used in the T. C. C. process had a layer of insulation on the outside of the vessel wall to prevent excessive heat loss through the wall of the vessel. The insulation was customarily coated on the exterior of the wall of the vessel or sometimes enclosed in a metal casing to protect it from the weather. Nevertheless, the wear and tear on the insulation due to weather was extensive. Another principal disadvantage of the early kiln was that it offered no protection to the shell from the high temperature within the kiln.

Therefore, on newer T. C. C. units the insulation was placed on the inside of the shell. This made it possible to use cheaper metal for the shell and reduced the temperature stresses and corrosion of the shell. This change also protected the shell wall from abrasion due to the flowing catalyst. Soft insulating material, in block or bulk form, could not be used inside the shell unless protected with a hard liner of some kind. In the past, metal liners have been suggested and used in some places, such as in some T. C. C. reactors, but these liners must obviously be of light gauge metal, or they would amount to another vessel shell. The light gauge liners were usually continuous, or at least in very large sections, and therefore they warped and buckled due to expansion and contraction caused by the temperature changes occurring in the vessel, there being no feasible method for supporting them in the reactor with adequate provision for expansion and contraction. These liners were not used in the kiln. Instead, a hard refractory-type insulation which could withstand the abrasive action of the catalyst was used, chiefly in the form of an inner facing over a block-type insulating material. A hard ladle-mix fired tile was used in the form of rectangular pieces interconnected by tongue-and-groove joints. The tile was supported on castings which were imbedded in the insulating material and supported by the shell of the kiln. The tiles required special manufacture and assembly. The tiles were normally prepared about 3½ inches thick for the purpose of insuring adequate strength and had little insulating value. Between the tile and the shell of the kiln the softer, more effective insulating material, such as mineral wool, was located usually in blocks about 4½ inches thick.

It has been discovered that due to the pressure drop developed through the kiln or reactor to effect the necessary gas flow through the bed, some gas was induced to flow between the insulation and the vessel wall. This caused rat-holing of the insulation and gradual physical breakdown of the insulating lining. In addition, there was found to be some abrasion of the hard insulation or tile due to the catalyst flow. Also, the insulating value of the hard refractory-type insulation or tile is low in comparison with that of the mineral wool type of softer insulation so that the insulating wall had to be thicker than desired, decreasing the volume of the kiln available for catalyst regeneration.

It is an object of this invention to provide a vessel insulating lining which overcomes the above-indicated disadvantages of the prior art.

It is a further object of this invention to provide an improved insulation lining for a high-temperature vessel.

It is a further object of this invention to provide an improved kiln for a moving-bed hydrocarbon conversion system which has incorporated in it an improved insulation lining.

These and other objects of the invention will be made apparent in the following detailed description of the invention and the referenced drawings.

Figure 1 is a vertical sectional view of a moving bed kiln incorporating the new insulation lining.

Figure 2 is a detailed view of one shingle of the liner of the kiln.

Figure 3 is a vertical view of a portion of the kiln wall showing details of several rows of shingles, both vertically and laterally, as installed.

Figure 4 is a vertical view in cross-section of a portion of the kiln wall showing the insulation lining in position.

Figure 5 is a detailed view showing the shingle mounting.

Figure 6 is a horizontal sectional view of a portion of the kiln showing the shingle mounting.

The invention in one of its broader aspects provides an improved contacting vessel for high temperature operation with moving granular solids. The vessel is mounted vertically with entrance and exit for granules at the top and bottom thereof. The gas is introduced through gas inlet means at one level and removed through gas outlet means a substantial vertical distance from the inlet means. The vessel is equipped with an insulation lining about the inner wall of the vessel formed from a series of rectangular shingles which overlap on their ends and sides to form a continuous shingle liner. The shingles are hung from their upper ends and are loosely pinned down on their lower ends and also on one side in such a way that the lower portion of each shingle can move laterally and vertically, but not inwardly. An insulating material is packed in the space between the shingle liner and the vessel wall and at spaced elevations along the vertical length of the vessel, partitions are located between the shingle liner and the vessel wall to prevent the vertical transfer of gas through the chamber formed between said shingle liner and said vessel wall.

Referring now to Figure 1, there is shown in vertical cross-section a kiln adapted for use in a T. C. C. system. The vessel 10 is a vertical shell having a supply conduit 11 projected downwardly into the top thereof to supply a continuous stream of solids to the vessel. The bottom of the vessel is funnel-shaped to permit the solids to feed into the withdrawal conduit 12. A partition 13 is located horizontally across the upper portion of the vessel 10 and drop pipes 14 depend therefrom to provide passage for the solids into the contacting section of the vessel. The solids are gravitated through the vessel in the form of a substantially compact column and are contacted with air in the lower portion of the vessel. Air is introduced through the conduit 15 and channels 16 to pass upwardly through the voids in the bed. The solids are in a heated condition and, therefore, the air burns the carbonaceous deposit on the contacting surface of the solids. Flue gas formed by the combustion is removed from the vessel via the conduit 16. The temperature in the vessel is maintained above the combustion temperature of the coke on the surface of the contact material but below the heat-damaging level when catalyst is being regenerated. The temperature may be about 1000–1300° F. normally when cracking catalyst is used. It may be necessary to provide cooling coils in the vessel in some instances to prevent the temperature from rising above the heat-damaging level. The coils, being conventional, are not shown. Of course, when inerts are used, the kiln serves primarily as a heater and the temperature may be raised substantially to 1300° F. The liner 17 about the inner wall of the vessel is the subject of this invention and will be disclosed in more detail with reference to the remaining figures.

The liner is formed from a multiplicity of separate shingles which are connected together in a manner to be described to form the assembled shingle liner. A single shingle is shown diagrammatically on Figure 2. The shingle is formed of a rectangular piece of thin, flat metal. The upper end of the shingle is bent over about 90 degrees to provide a flange 20. The flange 20 is used to support the body 21 of the shingle in an upright position. A V-shaped slit is cut in the flange 20 at about the center of the shingle and the shingle is bent slightly about the vertical axis. Pins 22 are located at the upper end of the shingle and on one side of the shingle. Holes 23 are located at the lower end of the shingle and on the opposite side from the pins 22. These pins and holes will be shown in more detail on other figures and will be described with reference to those figures. The shingles can be fabricated from a variety of materials capable of withstanding the high temperature and abrasion due to catalyst flow, such as 18 per cent chromium–8 per cent nickel steel alloy and 25 per cent chromium–12 per cent nickel steel alloy. The shingle need not be thicker than about 3/16 inch and preferably about 14 gauge metal. The height and width of each shingle should be no greater than 24" x 24" with a 4" flange and preferably 20" x 12" with a 3" flange, although this will vary to some extent, depending upon the diameter of the vessel.

Figure 3 shows a portion of the shingle liner, illustrating how the related shingles are interconnected. For example, the shingle 30 has pins 22, 22 at the upper end projected outwardly through holes 23, 23 in the shingle 31 located just above the shingle 30. The upper end of each shingle is permanently attached to the interior of the vessel wall but the lower portion of the shingle is free. The pins 22 at the upper end of shingle 30 hold the lower end of shingle 31 close to the fixed upper end of shingle 30, permitting lateral and vertical movement only. The pins 22 have a head which is longer than the diameter of the hole 23, so that the head of the pin 22 is always in sliding contact with the metal of the overlapping shingle. The pin 22 on the left-hand side of the shingle 30 is passed through the hole 23 in the right-hand side of the shingle 32 and, therefore, holds the shingle 32 in position. The shingles are bent on the line 33 to permit the shingles to follow more closely the circular contour of the vessel. It is seen that easily-fabricated metal shingles can be used and quickly assembled to provide a thin continuous shingle liner, capable of withstanding the radical changes in temperature between atmospheric and operating temperature encountered in T. C. C. kilns.

Figure 4 shows a detail of the vessel wall 10 with shingles 30, 31 and 33 in position. The flange 20 of shingle 30 is mounted over the ledge 35. The shingle is welded to the ledge and the ledge to the vessel wall 10. A layer of concrete 40 is located on the flange 20 and provides a continuous seal about the annular chamber between the shingles and the vessel wall. The concrete layer is preferably provided at all levels to prevent the flue gas from by-passing the catalyst bed through the annular chamber. A castable or block insulation 41, such as mineral wool of high insulating value, is placed between the wall 10 and shingles 30, 31, 33. The insulating material is also supported on the flanges 20 by the ledges 35. The pins 22 are shown holding the loose ends of the over-lapping shingles in position. Figure 5 shows a detail of the lining illustrating the pin and hole assembly. The ledge 35 is shown welded to the wall of the vessel 10. The flange 20 of the shingle is then welded to the ledge 35 and the concrete partition 40 located on top of the flange 20. The block insulation 41 is packed into place during assembly. The pin 22 is welded to the lower shingle and projects through the hole 23 in the over-lapping shingle.

Figure 6 shows a plan view of a portion of the shingle liner. The circular shell 10 of the kiln is shown with ledges 35 projecting inwardly from the inner surface. The shingle flange 20 is located over the ledges. The slit in the flanges permit the shingles to fit more closely to the circular vessel wall 10. The shingle flanges are over-lapped slightly and extend almost to the vessel wall, thereby providing a substantial impedence to gas flow through the annular chamber formed between the shingle liner and the vessel wall. In addition, a layer of concrete is placed on the top of the flanges to completely traverse the annular cross-section at the level of each layer of shingles. This is shown on Figure 4.

Example

A typical T. C. C. kiln 12'-0" I. D. by 38'-3⅝" high regenerates 80 tons of catalyst per hour by burning off 1700 pounds of carbon using 5350 standard cubic feet per minute of air. The catalyst enters at 800° F. and leaves the kiln at 1250° F. The wall of the kiln is made of ⅜" carbon steel plate. The insulation consists of blocks 12" x 18" x 3" thick made of mineral wool or diatomaceous earth with a thermal conductivity factor of about 1. The shingles are 20½" x 12" by 3" made of 14 gauge type 304 stainless steel welded to the shell which runs at a temperature of 160° F.

Silica-alumina catalyst is introduced at the top of the kiln and flows by gravity, essentially as a solid column through the kiln and is discharged from the bottom. Combustion air is introduced near the midsection of the kiln; its flow is split, part flowing upwardly-countercurrent to the catalyst and part flowing downwardly concurrently with the catalyst.

The previous method of insulation using tile and "soft" insulation would have required 8" on the radius. The new method required a trifle over 3". This saving of 5" on the radius meant that a vessel 10" smaller in diameter could be used to accomplish the same job. This represents a 12 per cent saving in volume in this size kiln. In addition, it represents an approximate saving of 8 per cent in steel alone in the shell. The cost reduction represents about a $2.00 per square foot saving on insulation, and a .30 a pound saving on the steel for the shell.

Further advantage of this invention over the former kilns lies in the fact that the unit may be shop fabricated. It is estimated that in time alone for an average kiln about 30 days are saved. Previous methods of insulating had to be field fabricated irrespective of size due to the use of tiles in the insulating wall. The tiles were heavy and could not be held in position during transport. The metal shingles on the other hand are light and can be completely assembled and shipped as a unit ready for operation.

Shingles are most resistant to the abrasive action of the catalyst than the tile brick used previously. In the event of local hot spots, shingles can resist temperature to 1600° F. The tile bricks soften and wear more rapidly at this temperature range. Finally, shingles are better in preventing gases from by-passing because a layer of steel extends to the shell at each ring level.

When considering the invention broadly it is not limited to the particular details of hanging and pinning the shingles shown in the drawings. It is to be understood that the specific examples of apparatus, design and arrangement, are intended only as illustrative of the invention and it is intended to cover all modifications of the example herein chosen for purposes of disclosure, which do not constitute departure from the spirit and scope of the invention.

I claim:

1. An upright contacting vessel for high temperature operation with moving granular solids comprising: means defining a solids inlet at the top of the vessel, means defining a solids outlet at the bottom of the vessel, vapor inlet means intermediate the vertical length of the vessel, means to withdraw vapor from said vessel spaced a substantial vertical distance away from said vapor inlet means, and an insulating lining about the inner walls of said vessel formed of a plurality of rectangular shingles which overlap, on their ends and sides, to form a shingle liner, support ledges attached about the inner wall of the vessel, flanges located along the upper ends of said shingles, said flanges being attached to said ledges to support said shingles, means defining holes in each shingle at the lower end of each shingle and on one side of each shingle, pins of smaller diameter than said holes attached to the upper end and opposite side of each shingle, said pins having a head longer than the diameter of each hole and being centered under each hole so as to extend through the hole and permit the lower end and lower sides of each shingle to move substantially unimpeded in the vertical and lateral directions, an insulating material in the jacket space between the shingle liner and the vessel wall, and horizontally-extending partitions extending across the space between the shingle liner and the vessel wall at a plurality of vertically-spaced intervals, so as to prevent vertical gas flow through the jacket chamber.

2. An upright contacting vessel of circular cross-section for high temperature operation with moving granular solids comprising: means defining a solids inlet at the top of the vessel, means defining a solids outlet at the bottom of the vessel, vapor inlet means intermediate the vertical length of the vessel, means to withdraw vapor from said vessel spaced a substantial vertical distance away from said vapor inlet means, and an insulating lining about the inner walls of said vessel formed of a plurality of rectangular shingles which overlap, on their ends and sides, to form a shingle liner, support ledges attached about the inner wall of the vessel, flanges located along the upper ends of said shingles, said flanges being attached to said ledges to support said shingles in a vertical position, said shingles being bent along the vertical centerline, means defining holes in each shingle at the lower end of each shingle and on one side thereof, pins of smaller diameter than said holes attached to the upper end and opposite side of each shingle, said pins having a head longer than the diameter of each hole and being centered under each hole, so as to extend through the hole and permit the lower end and lower sides of each shingle to move substantially unimpeded in the vertical and lateral directions, an insulating material in the jacket space between the shingle liner and the vessel wall, and layers of concrete located on the flanges of the shingles and extending horizontally across the space between the shingle liner and the vessel wall, at a plurality of vertically-spaced intervals, so as to prevent vertical gas flow through the jacket chamber.

3. An upright contacting vessel for high temperature operation with moving granular solids comprising: means defining a solids inlet at the top of the vessel, means defining a solids outlet at the bottom of the vessel, vapor inlet means intermediate the vertical length of the vessel, means to withdraw vapor from said vessel spaced a substantial vertical distance away from said vapor inlet means, and an insulating lining about the inner walls of said vessel formed of a plurality of rectangular shingles which overlap, on their ends and sides, to form a shingle liner, support ledges attached about the inner wall of the vessel, flanges located along the upper edges of said shingles, said flanges being attached to said ledges to support said shingles, connecting members at the lower end of each shingle and on one side of each shingle, mating connecting members attached to the upper end and opposite side of each shingle, said connecting members being adapted to permit the lower end and lower sides of each shingle to move substantially unimpeded in the vertical and lateral directions, an insulating material in the jacket space between the shingle liner and the vessel wall, and horizontally-extending partitions extending across the space between the shingle liner and the vessel wall at a plurality of vertically-spaced intervals, so as to prevent vertical gas flow through the jacket chamber.

References Cited in the file of this patent

UNITED STATES PATENTS

| | | |
|---|---|---|
| 1,850,933 | Huff | Mar. 22, 1932 |
| 1,924,832 | Brandt | Aug. 29, 1933 |
| 2,020,630 | Anderson | Nov. 12, 1935 |
| 2,028,967 | Carlstrom | Jan. 28, 1936 |
| 2,375,710 | Traxler et al. | May 8, 1945 |
| 2,683,654 | Bergman | July 13, 1954 |